(12) United States Patent
Takahashi et al.

(10) Patent No.: US 10,252,499 B2
(45) Date of Patent: Apr. 9, 2019

(54) PROCESS FOR FORMING TRANSFER FILM

(71) Applicants: Eiichi Takahashi, Gunma (JP);
Nobuhiro Koga, Gunma (JP);
Yasuyuki Imaizumi, Tokyo (JP)

(72) Inventors: Eiichi Takahashi, Gunma (JP);
Nobuhiro Koga, Gunma (JP);
Yasuyuki Imaizumi, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 246 days.

(21) Appl. No.: 15/092,324

(22) Filed: Apr. 6, 2016

(65) Prior Publication Data

US 2016/0214362 A1   Jul. 28, 2016

Related U.S. Application Data

(60) Division of application No. 14/158,256, filed on Jan. 17, 2014, which is a continuation of application No.
(Continued)

(30) Foreign Application Priority Data

Mar. 31, 2005   (JP) ................................ 2005-102325

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/06* (2013.01); *B32B 7/12* (2013.01); *B32B 27/32* (2013.01);
(Continued)

(58) Field of Classification Search
CPC ......... Y10T 428/1476; Y10T 428/2848; Y10T 156/1084; B32B 27/08
(Continued)

(56) References Cited

U.S. PATENT DOCUMENTS 4,243,619 A   1/1981   Fraser et al.
4,313,994 A   2/1982   Kingston
(Continued)

FOREIGN PATENT DOCUMENTS

JP   S61-155000 A   7/1986
JP   H01-301300 A   12/1989
(Continued)

OTHER PUBLICATIONS

Feb. 4, 2016 Office Action issued in U.S. Appl. No. 14/158,256.
(Continued)

*Primary Examiner* — Scott W Dodds
(74) *Attorney, Agent, or Firm* — Oliff PLC

(57) ABSTRACT

A process includes forming a transfer film without a release layer in which the transfer film includes a substrate layer to be peeled off during a transfer process, and a transfer layer to be transferred to an article to be decorated. The transfer layer has a protective layer, a printed or vapor-deposited decorative layer, and an adhering layer, which are laminated in this order. The substrate layer is a base film of a synthetic resin formed by extruding a molten synthetic resin. The substrate layer is so laminated and thermally compressed in direct contact with the protective layer such that the substrate layer does not peel off the protective layer before the transfer process and peels off the protective layer from a peeled end portion of the substrate layer as a trigger during the transfer process, by thermally pressing the substrate layer and the protective layer between rolls.

4 Claims, 4 Drawing Sheets

Related U.S. Application Data

11/664,430, filed as application No. PCT/JP2006/306537 on Mar. 29, 2006.

(51) Int. Cl.

| | | |
|---|---|---|
| *B32B 27/34* | (2006.01) | |
| *B32B 27/32* | (2006.01) | |
| *B32B 27/36* | (2006.01) | |
| *B32B 7/06* | (2019.01) | |
| *B44C 1/17* | (2006.01) | |
| *B65D 35/08* | (2006.01) | |
| *B32B 37/14* | (2006.01) | |
| *B32B 37/00* | (2006.01) | |
| *B32B 37/06* | (2006.01) | |
| *B32B 37/10* | (2006.01) | |

(52) U.S. Cl.
CPC .............. *B32B 27/34* (2013.01); *B32B 27/36* (2013.01); *B32B 37/025* (2013.01); *B32B 37/06* (2013.01); *B32B 37/10* (2013.01); *B32B 37/14* (2013.01); *B44C 1/172* (2013.01); *B65D 35/08* (2013.01); *B32B 2323/046* (2013.01); *B32B 2367/00* (2013.01); *B32B 2377/00* (2013.01); *Y10T 428/1452* (2015.01); *Y10T 428/1486* (2015.01)

(58) Field of Classification Search
USPC ....................................... 156/230–251, 309.6
See application file for complete search history.

(56) References Cited

U.S. PATENT DOCUMENTS

| | | |
|---|---|---|
| 4,421,816 A | 12/1983 | Arnold |
| 4,548,857 A * | 10/1985 | Galante ................. B44C 1/1712 |
| | | 156/239 |
| 4,778,729 A | 10/1988 | Mizobuchi |
| 4,927,709 A | 5/1990 | Parker et al. |
| 5,380,587 A | 1/1995 | Musclow et al. |
| 5,618,630 A | 4/1997 | Benoit et al. |
| 5,676,785 A | 10/1997 | Samonides |
| 5,759,684 A | 6/1998 | Atake |
| 5,932,341 A | 8/1999 | Endo et al. |
| 5,981,009 A | 11/1999 | Iacono et al. |
| 5,985,079 A * | 11/1999 | Ellison .................. B32B 37/153 |
| | | 156/244.23 |
| 6,329,041 B1 * | 12/2001 | Tsuchiya .................... C08J 7/04 |
| | | 428/195.1 |
| 2008/0138550 A1 | 6/2008 | Takahashi et al. |

FOREIGN PATENT DOCUMENTS

| | | |
|---|---|---|
| JP | H06-155518 A | 6/1994 |
| JP | 2002-020704 A | 1/2002 |
| JP | 2002-252545 A | 9/2002 |
| JP | 2004-130585 A | 4/2004 |
| JP | 3107994 U | 1/2005 |

OTHER PUBLICATIONS

Sep. 9, 2015 Office Action issued in U.S. Appl. No. 14/158,256.
Aug. 4, 2011 Office Action issued in U.S. Appl. No. 11/664,516.
Isao et al., "Base Film for Mold Transfer Foil," Machine translation of abstract of JP 03-039243, Feb. 20, 1991.
Sota, "Transfer Sheet," English translation of JP 03-107994 U, Apr. 7, 2005.
Kimura, "Transfer Sheet, Manufacturing Method Thereof, and Film Formation Method Using this Sheet," English translation of JP 2002-20704, Jan. 23, 2002.
Imaizumi, "Tube Container and Method of Decorating Tube Body," Abstract of Japanese Patent No. 2010105692 A, May 13, 2010.

* cited by examiner (a)

(b)

PROCESS FOR FORMING TRANSFER FILM

This is a continuation of U.S. application Ser. No. 14/158,256 filed Jan. 17, 2014, which is a continuation of U.S. application Ser. No. 11/664,430 filed Mar. 30, 2007, which is a National Stage Application of PCT/JP2006/306537 filed Mar. 29, 2006, and claims the benefit of Japanese Application No. 2005-102325 filed Mar. 31, 2005. The entire disclosures of the prior applications are hereby incorporated by reference herein in their entirety.

TECHNICAL FIELD

This invention relates to a process for forming a transfer film used for a decorative purpose.

As the methods of decorating surfaces of synthetic resin molded products, a label is attached to the wall, or a transfer film is used. Patent Document 1, for example, describes an invention relating to transfer film. FIG. 6 shows a typical example of conventional transfer film described in Patent Document 1. As shown in FIG. 6, this transfer film 101 comprises a substrate 102, a release layer 106, a printed layer 112, and an adhering layer 107.

The transfer film 101 is heated and pressed by an in-mold process, a hot-stamping process, a hot rolling process, and the like. The adhering layer 107 is adhered to the surface of the molded product to transfer the printed layer 112 to the surface, and as a result, the decorative function of the film is fulfilled. The substrate 102 is separated and removed along with the release layer 106. The printed layer 112 can be further vapor-deposited with a metal.

[Patent Document 1] P2002-252545

DISCLOSURE OF THE INVENTION

Problems to be Solved by the Invention

As described above, the substrate 102 of the transfer film is peeled off together with the release layer 106. This release layer 106 plays an important role in the transfer process to ensure that the printed layer 112 can be transferred to the surface of the molded product, along with the adhering layer 107. If the release layer 106 has been inappropriately selected, problems may arise. For example, the substrate may be peeled before the transfer; the release of the substrate may not be smooth during the transfer process; or there remains the release layer on the surface of the transferred layer.

In order for the release layer to perform its sufficient function, it is necessary to make an appropriate selection of the ingredients including a release layer-forming synthetic resin as the main component. In addition, a high technology is required to coat the release layer material uniformly, thus resulting in the problem of a cost increase due to this coating process.

This invention has been made to solve the above-described problems involved in the transfer film. The technical problem to be solved by this invention is to eliminate the release layer from the transfer film. The object of this invention is to provide a transfer film that can be applied stably to the transfer process without any trouble.

Means of Solving the Problems

The means of carrying out the invention to solve the above-described technical problems is a transfer film comprising a substrate to be peeled off during the transfer process and a transferred layer to be transferred to an article to be decorated, both of which are laminated directly to each other in a peelable manner by an extrusion laminating process without requiring any release layer.

Under the configuration of a first embodiment, the substrate to be peeled off during the transfer process and the transferred layer to be transferred to the article to be decorated are laminated directly with each other in a peelable manner by the extrusion laminating process without requiring any release layer. The transferred layer is thermally pressed to the article to be decorated in tight contact therewith. The substrate can be easily peeled off from the transferred layer during the transfer process. The transferred layer referred to in this invention denotes the portion of the transfer film from which the substrate has been peeled off. Generally it includes a decorative layer such as the printed layer, an adhering layer to be adhered to the article to be decorated, or if necessary, a protective layer to protect the printed layer.

The extrusion laminating process involves extruding a molten synthetic resin from T die mounted on the extruder to form film and laminating this film with another layer or layers by thermally pressing the layers between rolls. By selecting a suitable synthetic resin for the extrusion lamination with the other layer or layers, i.e., by selecting a synthetic resin that is less compatible with the other layer or layers, it is possible to proceed with the peel-off easily and continuously over the entire surface of the transfer film, starting from a mechanically peeled portion at one end of the film, while securing adhesiveness that has been fulfilled by thermal compression.

Since the molten resin in the film form is laminated by thermally compressing the film with other layers by passing them between rolls, the underlying layer is easily coated with the film evenly over the entire surface. Both of adhesiveness and peelability can be controlled equally over the entire surface. Thus, it is possible to eliminate the problems associated with the release layer, such as the substrate that is peeled off before the transfer process, the substrate peel-off that does not proceed smoothly during the transfer process, or the release layer that remains stuck to the surface of the transferred layer.

The means of carrying out the invention according to a second embodiment comprises that, in the invention according to the first embodiment, the transferred layer has a protective layer, a printed or vapor-deposited decorative layer, and an adhering layer, which are laminated in this order, wherein at least either one of the substrate or the protective layer is a synthetic resin film, and wherein the substrate layer and the protective layer are directly laminated with each other in a peelable manner by the extrusion laminating process without requiring any release layer.

The transfer film having the configuration according to the second embodiment is a laminate film having the substrate, the protective layer, and the adhering layer. The transfer film is applied to the article to be decorated, by attaching the adhering layer to the wall to be decorated, and at the same time, by peeling off the substrate. Since the transfer film has the configuration that the substrate and the transferred layer are laminated directly with each other in a peelable manner by the extrusion laminating process without requiring any release layer, the substrate can be peeled off under the condition that the transferred layer is thermally compressed and adhered to the article to be decorated.

The protective layer performs its inherent function of, e.g., preventing scratches from occurring in a long period of use. Furthermore, since this protective layer covers the decorative layer including the printed layer and is laminated with the substrate entirely over the surface, the adhesiveness of the laminated and thermally compressed layers, as well as the peelability between these layers, can be secured evenly and stably over the entire surface whichever of the substrate or the protective layer is molten and extruded from the T die on the extruder to form the film.

The means of carrying out the invention according to a third embodiment comprises that, in the invention according to the second embodiment, the protective layer is a protective film of a synthetic resin, which is directly laminated with the substrate layer in a peelable manner by the extrusion laminating process.

The transfer film according to the third embodiment has its printed decorative layer always covered with, and protected by, the protective film. For example, commonly used general-purpose synthetic resins, such as polyethylene (PE), polypropylene (PP), and AS resin, can be utilized to obtain a sufficiently flexible protective film. Therefore, the transferred layer can fully withstand the extensive deformation caused by repeated squeezes, and ensures that the printed decorative layer is protected against peeling, scratches, or cracking. Thus, the decorated container can be utilized without giving any damage to the original condition of decorativeness.

The use of the transfer film is not limited to those containers which are squeezed and deformed. If ordinary synthetic resin molded products are decorated with this sufficiently flexible transfer film, the surface of the decorated container can be prevented from the shock of impact that occurs when something sharp butts the surface. The transfer film can also protect the container surface against cracks caused by a long period of use. If the transfer film of this invention is used to decorate the injection-molded compact cases for which a high grade of decorativeness is required, this high-grade decorativeness can be maintained without getting damage from impact shock or a long period of use. Furthermore, a soft feel can be attached to the surface, depending on the uses.

The means of carrying out the invention according to a fourth embodiment comprises that, in the invention according to the second embodiment, the substrate is a base film of a synthetic resin and that the protective layer is a hard coat layer of a UV- or heat-cured resin, wherein the base film is laminated directly with the hard coat layer in a peelable manner by the extrusion laminating process.

Under the above-described configuration according to the fourth embodiment, the base film can be laminated with the protective layer easily in a peelable manner by the extrusion laminating method because the hard coat layer is generally cross-linked three-dimensionally and is less compatible with those resins commonly used as the substrate of the transfer film, such as the polyethylene terephthalate (PET) resin, the PP resin, and the like. Due to the protective function of the hard coat layer, the decorative layer can be prevented effectively from scratches that occur during a long period of use.

The means of carrying out the invention according to a fifth embodiment comprises that, in the invention according to the second, third or fourth embodiments, the decorative film of a synthetic resin is laminated between the protective layer and the adhering layer and wherein the printed or vapor-deposited decorative layer is formed at least on either surface of the decorative film.

Under the above-described configuration according to the fifth embodiment, the decorative film is made of a synthetic resin material having highly decorative properties, such as printability or adhesiveness of the printed layer. Suitably selected materials can form a clear decorative layer of a high grade, increase the adhesive strength of the decorative layer including the printed layer, and fully withstand impact shock, a long period of use, and extensive deformation caused by repeated squeezes. The decorative layer can be formed on either or both sides of the decorative film.

The means of carrying out the invention according to a sixth embodiment comprises that in the invention according to the second, third, fourth or fifth embodiments, the adhering layer comprises the adhering film of a synthetic resin, which can be directly adhered by heat seal to the wall of the article to be decorated.

Under the above-described configuration according to the sixth embodiment, the adhering film used as an adhering layer is adhered by the heat seal directly to the wall of the article to be decorated. Because adhesive strength is large, the transferred layer can be used without being peeled off or wrinkled under impact shock, a long period of use, and extensive deformation caused by repeated squeezes, and the initial state of decorativeness can be maintained securely. In order to ensure that the adhering film is directly adhered by the heat seal to the wall of the article to be decorated, the adhering film is optimally made of a material of the same nature as the wall of the article to be decorated.

The means of carrying out the invention according to a seventh embodiment comprises that, in the invention according to the fifth or sixth embodiments, the transfer film comprises the base film of a polyethylene terephthalate (PET) resin, the protective film of a low-density polyethylene resin (LDPE), and the decorative film of a nylon resin.

The above-described configuration according to the seventh embodiment is an illustrative embodiment of the laminar structure of the transfer film. The PET film, especially the biaxially drawn PET film, has high transparency and heat resistance and is available at a relatively low price. Because the PET film is elastic and yet sturdy, it can fulfill its excellent function as the base film. LDPE has a high extrusion laminating property. Among ordinary synthetic resins, the LDPE has a relatively flexible property, and can fully prevent cracks from occurring in the decorative layer. In addition, with its high transparency, the LDPE is one of the most suitable materials for the protective film. Nylon resins excel in the decorativeness, such as printability, and enable the decorative layer to have enhanced adhesive strength. Nylon has also high heat resistance, and can fulfill excellent functions as the decorative film.

Under the above-described configuration, the protective film can be laminated onto the base film by the extrusion laminating process. The base film can be laminated with the decorative film by a dry laminating process, with the adhesive layer disposed in between. If the article to be decorated is, e.g., a polyethylene tubular container or a blow molded container, the adhesive layer based on the adhering film of LDPE can be heat-sealed directly to the wall surface of the container as long as the LDPE adhering film is laminated with the decorative film by the adhesive layers.

Effects of the Invention

This invention having the above-described configuration has the following effects:

In the invention according to the first embodiment, the entire surface is coated easily by the extrusion laminating process. Both the adhesiveness and the peelability can be stably controlled by the heat seal. The substrate can be peeled off smoothly without allowing a part of the peeled material to remain on the transferred layer, thus easily solving the problems associated with the release layer.

In the invention according to the second embodiment, prevention of scratches in the decorative layer is the primary function of the protective layer, and this function is fulfilled sufficiently. Since this protective layer is laminated entirely with the substrate, while covering the decorative layer, such as the printed layer, both the adhesiveness and the peelability can be secured by the heat seal over the entire surface of contact between the base film and the transferred layer.

In the invention according to the third embodiment, the entire surface of the decorative film is covered with the protective film. Therefore, the transferred layer can fully withstand the extensive deformation caused by repeated squeezes, and ensures that the printed or vapor-deposited decorative layer is protected against the scratches caused by impact shock or against cracking caused by a long period of use. Thus, the decorated container can be used without giving any damage to the original condition of decorativeness.

In the invention according to the fourth embodiment, the hard coat layer enables the base film to be laminated easily with the transferred layer in a peelable manner by the extrusion laminating process, and prevents scratches from occurring.

In the invention according to the fifth embodiment, the decorative film is made of a synthetic resin material having highly decorative properties, such as printability or adhesiveness of the printed layer. Suitably selected materials can form a clear decorative layer of a high grade and increase the adhesive strength of the decorative layer including the printed layer.

The invention according to the sixth embodiment makes it possible to adhere the decorative film to the article to be decorated more strongly than ever and to prevent effectively the peel-off and the wrinkle occurrence caused by impact shock, a long period of use, and extensive deformation caused by repeated squeezes. The initial state of high-grade decorativeness can be maintained reasonably.

The configuration according to the seventh embodiment is a laminar structure of the transfer film in an illustrative embodiment of this invention. The transfer film comprises, for example, the base film made of PET, the protective film made of LDPE, and the decorative film made of a nylon resin. Under this structure, each layer can fully perform the required function. On the whole, the transfer film has high processability, transferability, and decorativeness.

EXPLANATION OF CODES

Figure 1:
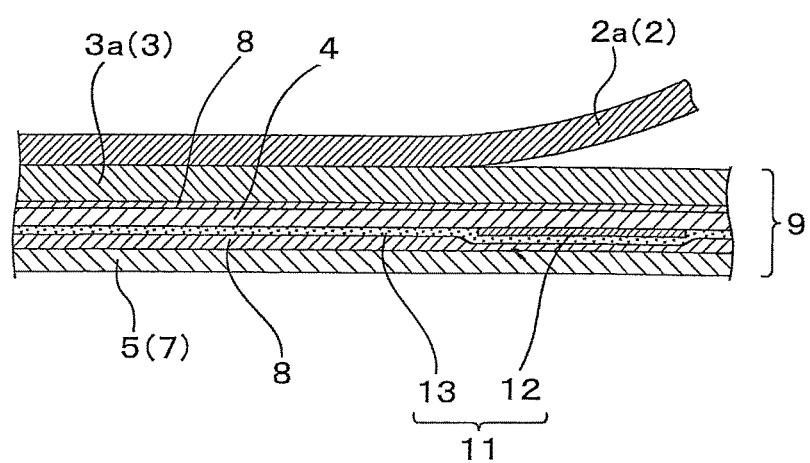
FIG. 1 is a vertical section showing the laminar structure of the transfer film in one embodiment of this invention.

1. Transfer film
2. Substrate
2a. Base film
3. Protective layer
3a. Protective film
3b. Hard coat layer
4. Decorative film
5. Adhering film
7. Adhering layer
8. Adhesive layer
9. Transferred layer
11. Decorative layer
12. Printed layer
13. Vapor-deposited layer
21. Tubular container
22. Body wall
23. Head
24. Window
101. Transfer film
102. Substrate
106. Release layer
107. Adhering layer
112. Printed layer
HR. Hot roll
C. Core jig

PREFERRED EMBODIMENTS OF THE INVENTION

This invention is further described with respect to embodiments of this invention, now referring to the drawings, in which FIG. 1 is a vertical section showing the laminar structure of the transfer film in one embodiment of this invention. In FIG. 1, this transfer film is a laminate film comprising, from top to bottom, the base film 2a of a PET drawn film, the protective film 3, which is a protective film 3a of an LDPE resin, an adhesive layer 8, the decorative film 4 of a nylon resin, the printed layer 12, the aluminum vapor-deposited layer 13, another adhesive layer 8, and the adhering film 5. The transferred layer 9 is formed from these layers by the thermal compression and is transferred to the article to be decorated.

The base film 2a, the protective film 3a, the decorative film 4, and the adhering film 5 have a thickness of 25, 30, 15, and 15 microns, respectively. The protective film 3a is obtained by extruding molten LDPE from a T-die to form film on top of the base film 2a and hot-pressing and laminating both sheets of film by the extrusion laminating process. The base film 2a and the protective film 3a are laminated and in tight contact with each other, but can be easily separated because the PET and the LDPE are less compatible with each other. In FIG. 1, a portion of the base film 2a on the right end is shown in a state that has been separated from the transferred layer 9.

In this embodiment, the printed layer 12 and the aluminum vapor-deposited layer 13 of the decorative layer 11 are formed on the underside of the decorative film 4. The protective film 3a and the decorative film 4 having the decorative layer 11 are laminated by the dry laminating process, with an adhesive layer 8 placed in between. The decorative film 4 and the adhering film 5 are also laminated similarly by using another adhesive layer 8.

The decorative layer 11 in this embodiment comprises a printed layer 12, which is formed at intervals on the underside of the decorative film 4, and an aluminum vapor-deposited layer 13 laid over the entire underside of the decorative film 4 so as to cover this printed layer 12. It is also possible for the printed layer 12 to be formed partially or entirely over the surface of the decorative film 4. The decorative layer 11 may not necessarily be formed on the underside of the decorative film 4. The printed layer 12 can be formed on one surface of the decorative film 4, and the vapor-deposited layer 13 can be formed on the other surface. Thus, the decorative layer 11 can be formed in various manners, depending on the intended decorative effects.

Figure 2:
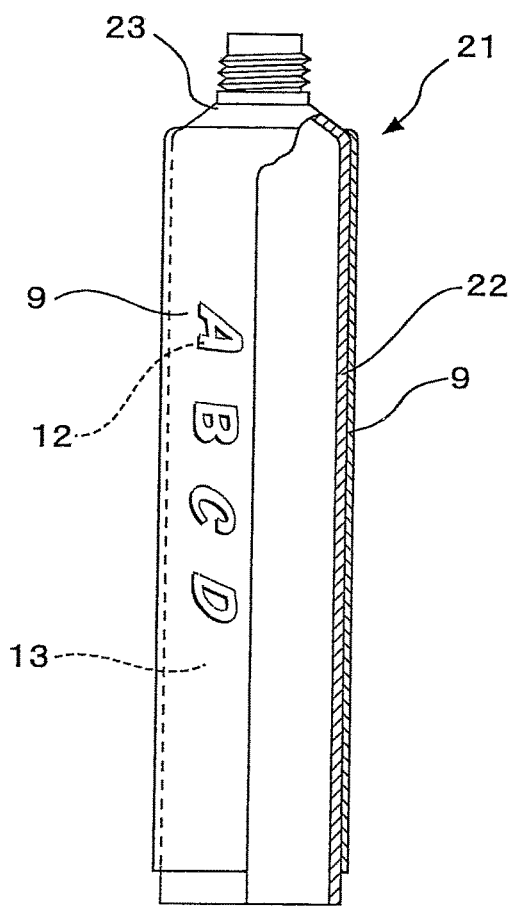
FIG. 2 is (a) a front elevational view, and (b) a cross-sectional plan view, of the tubular container decorated with the transfer film of FIG. 1 in one embodiment of this invention.
Figure 2:
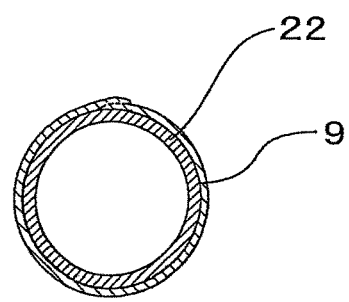

FIG. 2 shows (a) a front elevational view, and (b) a cross-sectional plan view, of the body of a tubular container, which is decorated with the transfer film 1 in the above-described embodiment of this invention. This tubular container 21 is made of LDPE, and comprises a cylindrical tubular molded product that has been extrusion-molded and cut in an appropriate length and has had a head 23 fitted to the body by the heat seal in an exclusive mold.

The body has been decorated over the roughly entire height and around the entire circumference by using the transfer film shown in the above-described FIG. 1. The transferred layer 9 has been transferred to the body wall 22 so as to perform the desired decorative function in a later-described hot rolling process in which the adhering film 5 (the adhering layer 7) of the transfer film 1 is adhered to the body wall 22 while peeling off the base film 2a at the same time.

The transfer film in the embodiment shown in FIG. 1 has the printed layer 12 formed at intervals on the underside of the decorative film 4. Furthermore, an aluminum vapor-deposited layer 13 is laid over the roughly entire underside surface so as to cover the printed layer 12. Referring to FIG. 2(a), stylized letters ABCD of the printed layer 12 are designed in the metallic background formed over the entire body surface by the aluminum vapor-deposited layer 13. The decorative designs can also be laid out over the entire body surface of the container, thus providing high-grade decorations and giving sophisticated images to the products.

The adhering layer 7 of the transfer film 1 shown in FIG. 1 is the adhering film 5 made of LDPE and is heat-sealed and directly adhered to the body wall 22 of the tubular container 21 by the hot rolling process.

Figure 3:
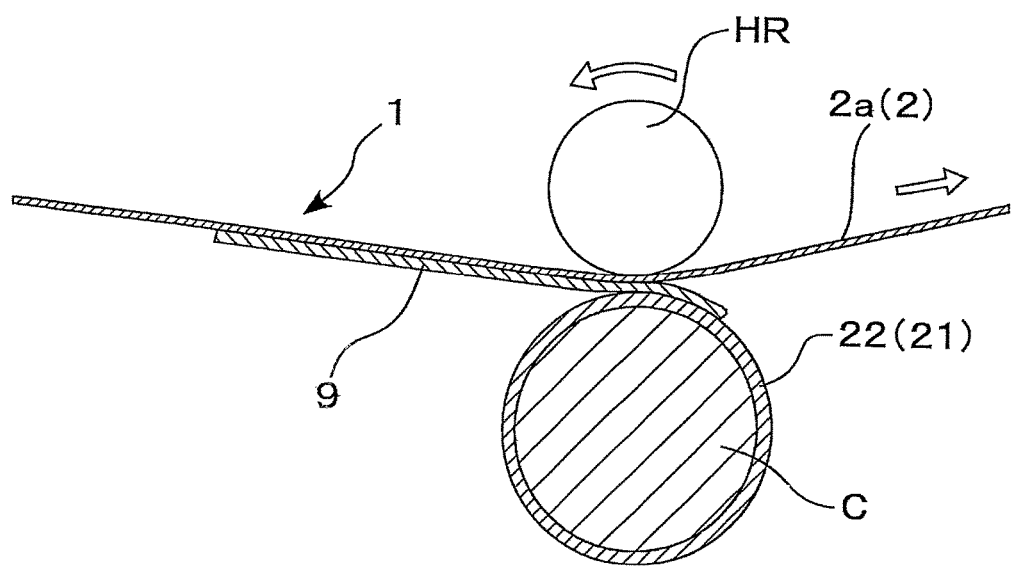
FIG. 3 is an explanatory diagram schematically showing an example of the process of transferring the transfer film to a tubular container.

FIG. 3 is an explanatory diagram showing schematically an example of the hot rolling process for transferring the transfer film 1 to the body wall 22 of the tubular container 21. A core jig C for keeping the body in shape is inserted into the body of the tubular container 21. The hot roll HR is heated to a temperature of 220-230° C. and rotated. The adhering film 5 is heat-sealed to the body wall 22 under the condition that the transfer film 1 is sandwiched between the hot roll HR and the core jig C and is pressed to the body wall 22. At that time, the substrate 2, i.e., the base film 2a, is peeled off, and the transferred layer 9 is transferred to the body wall 22.

The base film 2a is laminated and thermally compressed in tight contact with the protective film 3a by the extrusion laminating process, and never peels off before the transfer. The PET resin of the base film 2a and the LDPE resin of the protective film 3a are less compatible with each other. If a portion of the base film 2a is mechanically peeled off (See FIG. 1), then it is possible to proceed with the peel-off operation easily and continuously over the entire surface of the base film 2a, starting from this mechanically peeled portion at one end of the film.

Figure 4:
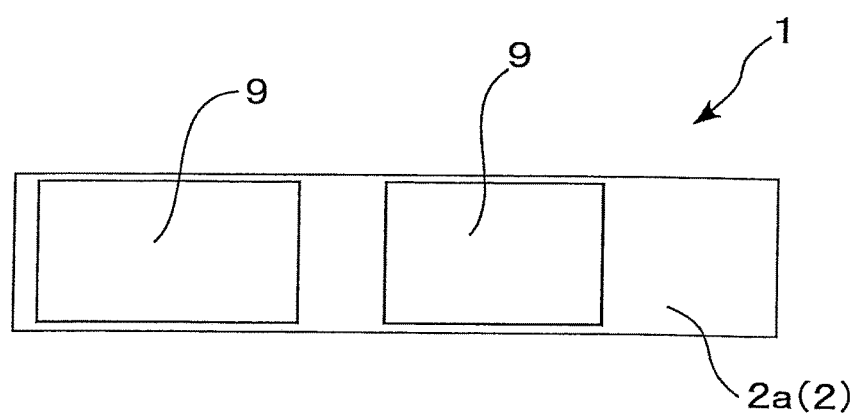
FIG. 4 is a plan view showing an embodiment of the transfer film used in the process of FIG. 3.

FIG. 4 is a plan view of the transfer film 1 used in this process. The transferred layer 9 has been punched in a rectangular shape by a cutting tool as deep as the thickness of the transferred layer 9. The rectangular portions alone of the transferred layer 9 are left there, and the rest of the transferred layer 9 has been peeled off.

The tubular container 21 of FIG. 2 was manufactured and decorated in such a process, and was filled with a creamy cosmetic material. The open lower end of the container 21 was heat-sealed, and the container was tested for its use by squeezing the body repeatedly to discharge the contents. There was no peel-off of the transferred layer 9 from the tubular container 21, no wrinkle occurring, and no cracking of the printed layer 12 or the vapor-deposited layer 13.

Figure 5:
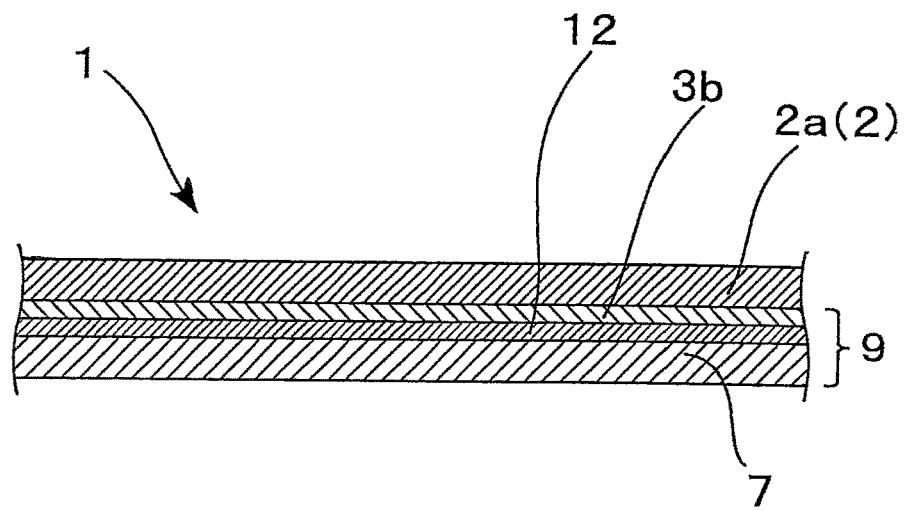
FIG. 5 is a front elevational view of the laminar structure in another embodiment of this invention.
Figure 6:
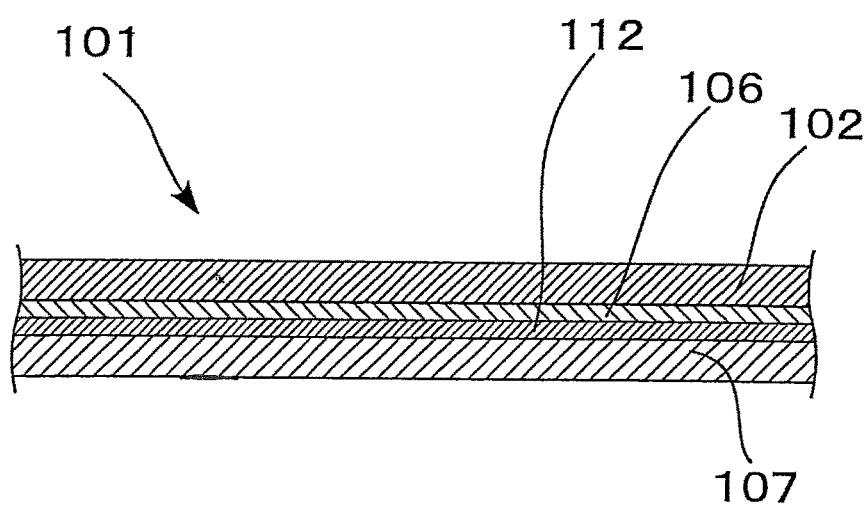
FIG. 6 is a vertical section showing the laminar structure of the transfer film in conventional art.

FIG. 5 is a vertical section showing the laminar structure of the transfer film in another embodiment of this invention. This transfer film comprises, from top to bottom, a substrate, i.e., a base film 2a of PP, a protective layer, i.e., a hard coat layer 3b of a UV-cured acrylic resin, a printed layer 12, and an adhering layer 7 of a heat-sealed type, all of which have been laminated in this order. The transfer film 101 shown in FIG. 6 has a similar laminar structure, but its release layer 106 has been replaced with the hard coat layer 3b.

This transfer film 1 is obtained by extruding the molten PP resin from the T die onto the hard coat layer 3b of the transferred layer 9 in the film form and laminating and thermally compressing thus-obtained base film 2a with the transferred layer 9 by the extrusion laminating process. This base film 2a can be easily peeled off during the transfer process.

The transfer film of this invention has been described with respect to preferred embodiments. However, it is to be understood that this invention is not limited to these embodiments. The action and effect of this invention, which are available under the configuration in which the layers of the transfer film are laminated directly in a peelable manner by the extrusion laminating process without requiring any release layer, are also applicable to the transfer films of various laminar structures adapted to respective purposes of use.

In view of the functions of the substrate 2 and the protective layer 3, various materials can be selected and used for these layers. Even artificial paper may be used as the substrate 2. For the protective layer 3, transparent, relatively flexible films can be used. For example, in the case of squeezable and deformable containers, the materials available for the protective film 3a include an LDPE resin, a linear, low-density polyethylene (LLDPE) resin, a PP resin, a polystyrene-related resin, and the like.

Not only the hot rolling process but also the hot stamping process and the in-mold process can be used in the label-transferring process of this invention, depending on the position or extent of transfer and on the nature of the synthetic resin containers and other articles to be decorated.

INDUSTRIAL APPLICABILITY

As described above, this invention provides the transfer film of various laminar structures in which the release layer has been eliminated. In addition, this invention reduces the production cost, increases the productivity in the transfer process, and can be expected to have wide applications.

The invention claimed is:

1. A process for forming a transfer film without a release layer, wherein:
   the transfer film comprises:
   a substrate layer to be peeled off during a transfer process, and
   a transfer layer to be transferred to an article to be decorated, wherein the transfer layer has a protective layer, an adhesive layer, a printed or vapor-deposited decorative layer, and an adhering layer, which are laminated in this order;

the substrate layer is comprised of a synthetic resin;
the substrate layer is laminated and thermally compressed in direct contact with the protective layer such that the substrate layer does not peel off the protective layer before the transfer process and peels off the protective layer from a peeled end portion of the substrate layer as a trigger during the transfer process;
the substrate layer and the protective layer are made from different materials such that they are laminated to each other in a peelable manner; and
the protective layer is a hard coat layer of a UV- or heat-cured resin; and the process comprises:
forming the substrate layer by an extrusion laminating process comprising extruding a molten synthetic resin;
laminating the substrate layer and the protective layer by thermally pressing the layers between rolls, and
laminating the protective layer to the printed or vapor-deposited decorative layer utilizing the adhesive layer.

2. The process for forming the transfer film according to claim 1, further comprising:
a decorative film of a synthetic resin laminated between the protective layer and the adhering layer, and
the printed or vapor-deposited decorative layer is formed on at least one surface of the decorative film.

3. The process for forming the transfer film according to claim 1, wherein the adhering layer comprises an adhering film of a synthetic resin which can be directly adhered by heat seal to a wall of the article to be decorated.

4. The process for forming the transfer film according to claim 1, wherein:
the substrate layer comprises a polyethylene terephthalate resin, and
the printed or vapor-deposited decorative layer is formed on a surface of a decorative film of a nylon resin.

* * * * *